US008963948B2

(12) United States Patent
Tsai

(10) Patent No.: US 8,963,948 B2
(45) Date of Patent: Feb. 24, 2015

(54) CIRCUIT FOR COLOR SPACE CONVERSION AND ASSOCIATED METHOD

(75) Inventor: Meng-Che Tsai, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 708 days.

(21) Appl. No.: 12/727,953

(22) Filed: Mar. 19, 2010

(65) Prior Publication Data

US 2010/0245383 A1 Sep. 30, 2010

(30) Foreign Application Priority Data

Mar. 25, 2009 (TW) .............................. 98109664 A

(51) Int. Cl.
*G09G 5/02* (2006.01)
*H04N 9/67* (2006.01)

(52) U.S. Cl.
CPC .......... *G09G 5/02* (2013.01); *G09G 2320/0242* (2013.01); *G09G 2340/06* (2013.01); *H04N 9/67* (2013.01)
USPC ....................................................... 345/604

(58) Field of Classification Search
CPC ....... G09G 5/04; G09G 5/06; G09G 2340/06; G09G 2360/02
USPC ................................................. 345/589–605
See application file for complete search history.

(56) References Cited

U.S. PATENT DOCUMENTS

| 5,463,480 | A | * | 10/1995 | MacDonald et al. .......... 358/520 |
| 5,740,076 | A | * | 4/1998 | Lindbloom .................... 345/590 |
| 5,987,165 | A | * | 11/1999 | Matsuzaki et al. ............ 382/162 |
| 6,882,445 | B1 | * | 4/2005 | Takahashi et al. ............. 358/1.9 |
| 7,589,769 | B2 | * | 9/2009 | Nakata et al. .................. 348/243 |
| 8,174,537 | B2 | * | 5/2012 | Chiang et al. ................. 345/604 |
| 2008/0129861 | A1 | * | 6/2008 | Choi et al. ................. 348/432.1 |
| 2008/0211830 | A1 | * | 9/2008 | Abe et al. ...................... 345/604 |
| 2008/0239353 | A1 | * | 10/2008 | Hori et al. ...................... 358/1.9 |
| 2008/0276293 | A1 | * | 11/2008 | Perry et al. .................... 725/118 |
| 2009/0002550 | A1 | * | 1/2009 | Kimura et al. ................ 348/441 |
| 2010/0008427 | A1 | * | 1/2010 | Chiu et al. ................ 375/240.18 |

* cited by examiner

*Primary Examiner* — Charles Tseng
(74) *Attorney, Agent, or Firm* — Han IP Corporation

(57) ABSTRACT

A circuit for color space conversion and associated method compresses a portion of an xvYCC color space exceeding an sRGB color space into the sRGB color space via a simplified circuit design when a conversion from the xvYCC color space to the sRGB color space is performed, thereby improving visual effects. The circuit for color space conversion includes a conversion unit converting a pixel signal from the xvYCC color space to the sRGB color space. During the conversion, the conversion unit generates a pixel component on each dimension of the sRGB color space, and compresses the pixel component to output a compressed pixel component when a value of any pixel component is in a compression interval. The compressed pixel component does not exceed a defined range on a corresponding dimension of the sRGB color space.

11 Claims, 4 Drawing Sheets

CIRCUIT FOR COLOR SPACE CONVERSION AND ASSOCIATED METHOD

CROSS REFERENCE TO RELATED PATENT APPLICATIONS

This patent application claims priority from Taiwan Patent Application No. 098109664, filed in the Taiwan Patent Office on Mar. 25, 2009, entitled "Circuit For Color Space Conversion and Associated Method", and incorporates the Taiwan patent application in its entirety by reference.

TECHNICAL FIELD

The present disclosure relates to color space conversion, and more particularly, to a circuit for color space conversion and a method thereof.

BACKGROUND

YCbCr and standard RGB (sRGB) color spaces are color space standards. In practice, an image device such as a digital camera or a DVD player outputs a YCbCr video signal to a display device, e.g., a digital television (DTV), which then converts the YCbCr video signal to an sRGB format for display. In the CCIR Recommendation 601 specification, Y representing luminosity, and Cb and Cr representing chromaticity are encoded by 8 bits, where Y has a range of 16 to 235, and Cb as well as Cr has a range of 16 to 240. A conversion formula for converting the YCbCr color space to the sRGB color space is described below:

$$\begin{bmatrix} R' \\ G' \\ B' \end{bmatrix} = \begin{bmatrix} 0.00456621 & 0. & 0.00625893 \\ 0.00456621 & -0.00153632 & -0.00318811 \\ 0.00456621 & 0.00791071 & 0. \end{bmatrix} \cdot \left( \begin{bmatrix} Y'_{601} \\ C_B \\ C_R \end{bmatrix} - \begin{bmatrix} 16 \\ 128 \\ 128 \end{bmatrix} \right)$$

A red (R) component, a green (G) component and a blue (B) component, respectively ranging from 0 to 1, range from 0 to 255 when represented by 8 bits.

As visual effect requirements of consumers become higher, the YCbCr color space is no longer satisfactory. Therefore, in recent years, an xvYCC (extended video YCC or called x.v.color) color space is developed on the basis of the YCbCr color space. The color range of the xvYCC is about 1.8 times of that of the YCbCr to provide more colorful display. Within the xvYCC color space, Y, Cb and Cr have enlarged ranges of being from 1 to 254 when encoded by 8 bits. When the enlarged ranges are converted according to the conversion formula, R, G and B components have enlarged ranges of being from −17.46 to 277 as illustrated in FIG. 1. However, portions outside the range of 0 to 255, i.e., −17.46 to 0 and 255 to 277, cannot be represented by 8 bits. In the prior art, the portion of −17.46 to 0 is truncated to 0, and the portion of 255 to 277 is truncated to 255. Therefore, extensive color ranges of the xvYCC color space cannot be displayed in the sRGB color space such that the visual effect is deteriorated.

SUMMARY

In view of the foregoing issues, one object of the present disclosure is to provide a circuit for color space conversion and a method thereof. The circuit compresses a portion of an xvYCC color space exceeding an sRGB color space into the sRGB color space via a simplified circuit design when color space conversion from xvYCC to sRGB is performed, thereby improving visual effect.

A circuit for color space conversion is provided to convert a pixel signal from a first color space to a second color space with a plurality of color dimensions. The circuit for color space conversion comprises a conversion unit. The conversion unit generates a plurality of pixel components on the color dimensions and compresses the pixel components to output a plurality of compressed pixel components when the pixel components are within a compression interval. The compressed pixel components are within a predetermined range of the dimensions of the second color space.

A method for color space conversion is provided. The method comprises receiving a pixel signal of a first color space, generating a plurality of pixel components on a plurality of color dimensions of the second color space for the pixel signal, and compressing the pixel components to output a plurality of compressed pixel components when the pixel components are within a compression interval. The compressed pixel components are within a predetermined range on the dimensions of the second color space.

DETAILED DESCRIPTION OF THE PREFERRED EMBODIMENT

Figure 1:
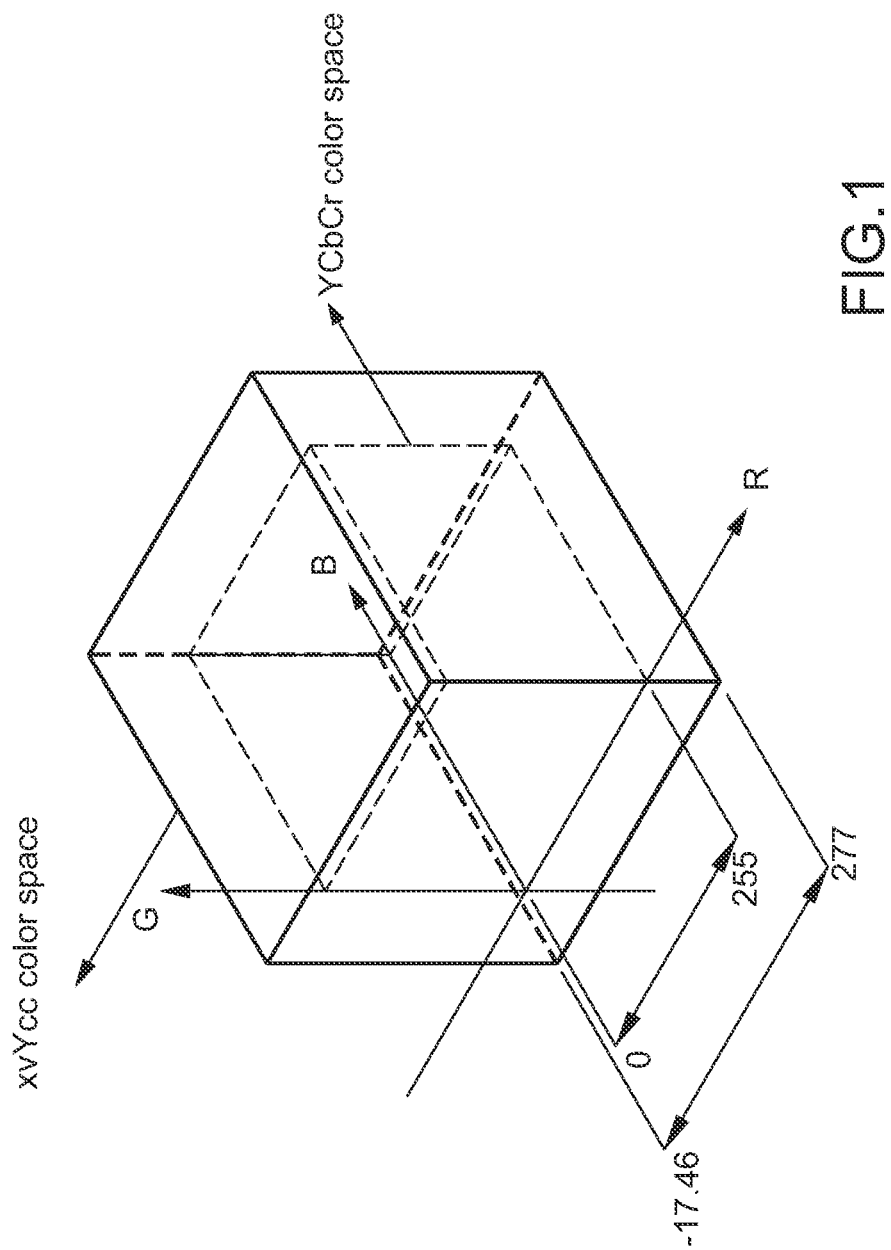
FIG. 1 is a schematic diagram of relative sizes between a YCbCr color space and an xvYCC color space.
Figure 2:
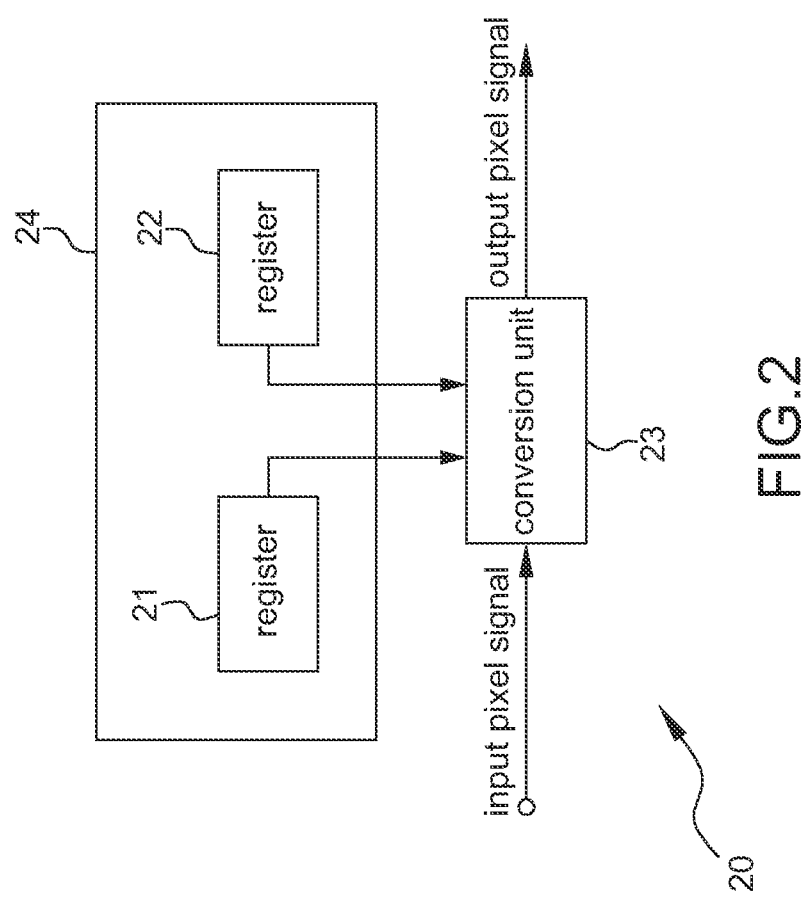
FIG. 2 is a block diagram of a circuit for color space conversion in accordance with an embodiment of the present disclosure.

FIG. 2 is a block diagram of a circuit 20 for color space conversion in accordance with an embodiment of the present disclosure. The circuit 20 comprises a register unit 24 and a conversion unit 23. The circuit 20 performs conversion from an xvYCC color space (to be referred to as the xvYCC) to an sRGB color space (to be referred to as the sRGB). Each of the three color dimensions, including R, G and B dimensions, of the sRGB has a defined range with a lower limit value and an upper limit value, which are respectively called a first lower limit value and a first upper limit value. When represented by 8 bits, the first lower limit value and the first upper limit value are 0 and 255 respectively. When the xvYCC is converted to the sRGB, with a lower limit value and an upper limit value, respectively called a second lower limit value and a second upper limit value, on the R, G and B dimensions, respectively. When represented by 8 bits, the second lower limit value and the second upper limit value are −17.46 and 277 respectively. The second lower limit value is smaller than the first lower limit value, and the second upper limit value is greater than the first upper limit value.

The register unit 24 comprises a register 21 and a register 22. The register 21 stores a first threshold and a first gradient, and the register 22 stores a second threshold and a second gradient, where the first threshold is greater than the second threshold. Parameters stored in the registers 21 and 22 can be adjusted according to user requirements. A conversion unit 23, coupled to the registers 21 and 22, converts an xvYCC input pixel signal to an sRGB output pixel signal according to the parameters stored in the registers 21 and 22. During the conversion, the conversion unit 23 converts the input pixel signal to pixel components, including R, G and B components, of the color dimensions of the sRGB. The conversion unit 23 then determines whether a value of each pixel component is within a compression interval. If yes, compression is performed; otherwise, compression is not performed. In other words, the compression interval represents a pixel value interval where compression is performed. In this embodiment, the compression interval comprises a pixel value interval having a lower limit value of the first threshold and an upper limit value of the second upper limit value, and another pixel value interval having a lower limit value of the second lower limit value and an upper limit value of the second threshold. Therefore, the compression interval can be adjusted by changing the first or second threshold. When a value of any pixel component, such as the R component for example, is greater than the first threshold and not greater than the second upper limit value such as a limit value on the red dimension of the xvYCC, the conversion unit 23 performs a first compression operation to output a first compressed pixel component. Accordingly, the first compressed pixel component is not higher than the first upper limit value (e.g., a limit value on the red dimension of the sRGB), and the first compressed pixel component has a linear relationship having the first gradient with the pixel component. When the value of any pixel component is smaller than the second threshold and not smaller than the second lower limit value, the conversion unit 23 performs a second compression operation to output a second compressed pixel component. Accordingly, the second compressed pixel component is not lower than the first lower limit value, and the second compressed pixel component has a linear relationship having the second gradient with the pixel component. With respect to any pixel component between the first threshold and the second threshold, the conversion unit 23 directly outputs the pixel component without compression. Therefore, for the output pixel signal outputted by the conversion unit 23, the R, G and B components are within the color range of the sRGB.

Figure 3:
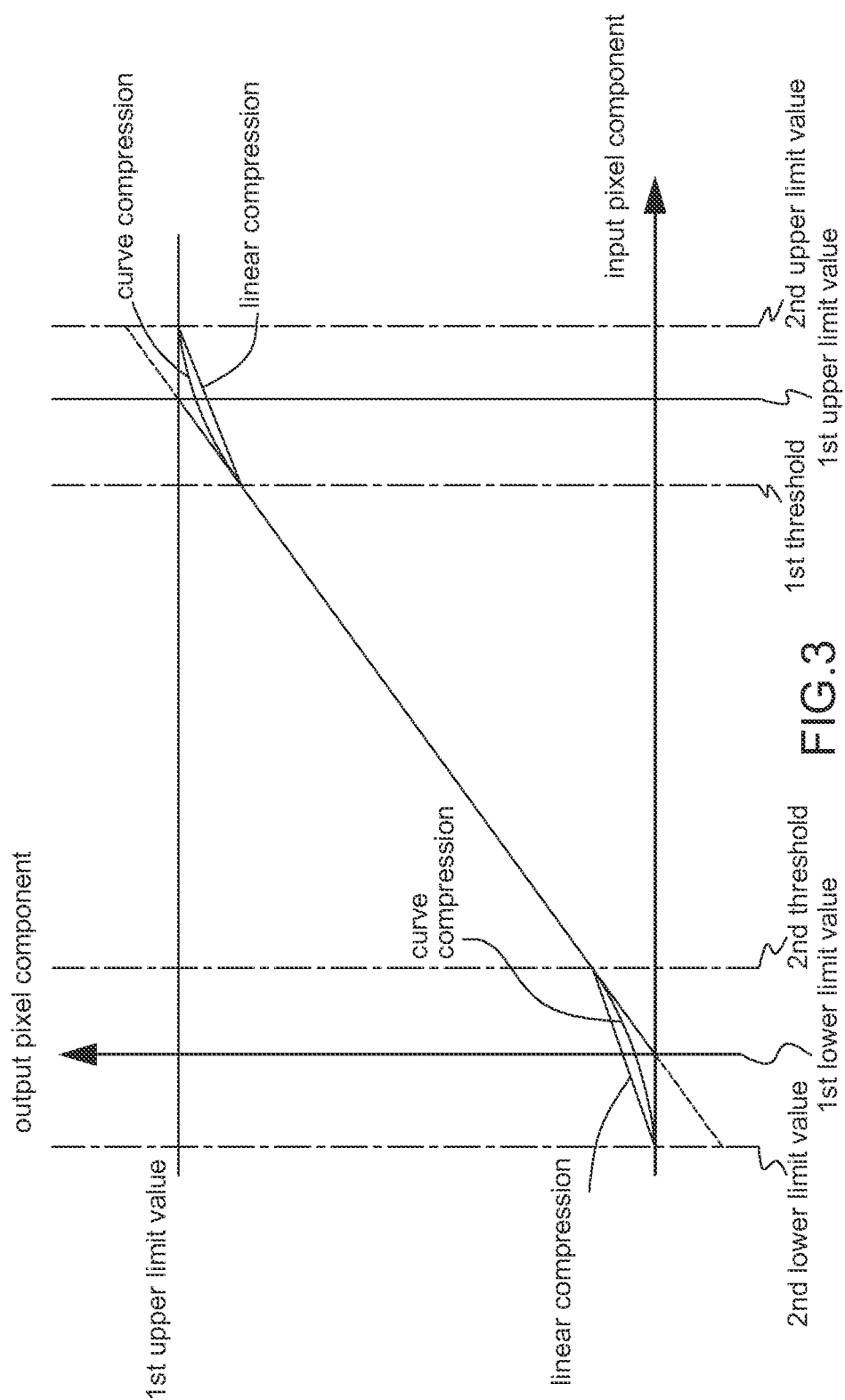
FIG. 3 is a diagram of color space compression in accordance with an embodiment of the present disclosure.

FIG. 3 is a diagram of color space compression in accordance with an embodiment of the present disclosure. An input pixel component is one of the R, G and B components converted by the input pixel signal as illustrated in FIG. 2. An output pixel component is one of the R, G and B components comprised in the output pixel signal as illustrated in FIG. 2. Referring to FIG. 3, when the input pixel component is greater than the first threshold and not greater than the second upper limit value, or is smaller than the second threshold and not smaller than the second lower limit value, it is compressed to generate the output pixel component. Thus, the pixel components exceeding the sRGB color range can be compressed into the sRGB color range to be displayed as colors of various levels instead of being processed as a same color level. For example, the R component at 260 and 270 exceeding the upper limit value 255 shall be displayed as red of different levels after having been processed instead of being regarded as red at 255. FIG. 3 shows two kinds of compression approaches—one is a curve compression and the other is a linear compression in this embodiment. Preferably, the curve compression is generated according to a Gamma curve to meet human visual effect. Alternatively, in the circuit 20 for color space conversion according to the present disclosure the linear compression approach is applied, thereby reducing circuit cost as well as achieving a visual effect approximating the curve compression.

In this embodiment, a slope between the first threshold and the second upper limit value represents a first gradient, with which the linear compression is performed. That is, the first compression operation is performed according to Formula 1:

Output pixel component=(input pixel component−first threshold)×first gradient+first threshold   (Formula 1)

A slope between the second threshold and the second lower limit value represents a second gradient, with which the linear compression is performed. That is, the second compression operation is performed according to Formula 2:

Output pixel component=(input pixel component− second threshold)×second gradient+second threshold   (Formula 2)

Formula 1 performs linear interpolation between the first threshold and the second upper limit value, and Formula 2 performs linear interpolation between the second threshold and the second lower limit value. Preferably, the conversion circuit 23 comprises an interpolation circuit (not shown) for performing the linear interpolation as disclosed by Formulas 1 and 2.

In Formula 1, when the input pixel component and the first compressed pixel component respectively have the second upper limit value and the first upper limit value, the first threshold is decided by a designer, and then the first gradient is determined by substituting the first threshold, the first upper limit value and the second upper limit value in Formula 1. Alternatively, the first gradient is decided by the designer, the first threshold is determined by substituting the first gradient, the first upper limit value and the second upper limit value in Formula 1. Similarly, in Formula 2, when the input pixel component and the second compressed pixel component respectively have the second lower limit value and the first lower limit value, the second threshold is decided by a designer, and then the second gradient is determined by substituting the second threshold, the first lower limit value and the second lower limit value in Formula 2. Alternatively, the second gradient is decided by the designer, the second threshold is determined by substituting the second gradient, the first lower limit value and the second lower limit value in Formula 2. Therefore, under such circumstances, the register 21 stores either the first threshold or the first gradient, and the register 22 stores either the second threshold or the second gradient, xvYCC color space conversion with improved visual effect can be realized by limited hardware.

In another embodiment, the conversion unit 23 comprises a lookup table (not shown) for storing the input pixel component and the corresponding output pixel component. When the input pixel component is greater than the first threshold and not greater than the second upper limit value, the corresponding output pixel component represents the first compressed pixel component. When the input pixel component is smaller than the second threshold and not smaller than the second lower limit value, the corresponding output pixel component represents the second compressed pixel component. When the input pixel component is between the first threshold and the second threshold, the original input pixel component represents the corresponding output pixel component. Accordingly, the conversion unit 23 performs first and second compression operations according to the lookup table.

Preferably, with respect to R, G and B components generated by converting an xvYCC input pixel signal, the conversion unit 23 respectively applies different thresholds and gradients to perform the abovementioned linear compression. The thresholds and gradients are stored in the registers 21 and 22.

For that the xvYCC is supported by the high definition multimedia interface (HDMI) standard starting from HDMI 1.3, the circuit 20 for color space conversion according to the present disclosure can be applied to an HDMI receiver, so as to convert an xvYCC format signal received by the HDMI receiver to an sRGB format signal to be displayed on a display device such as a digital TV.

Figure 4:
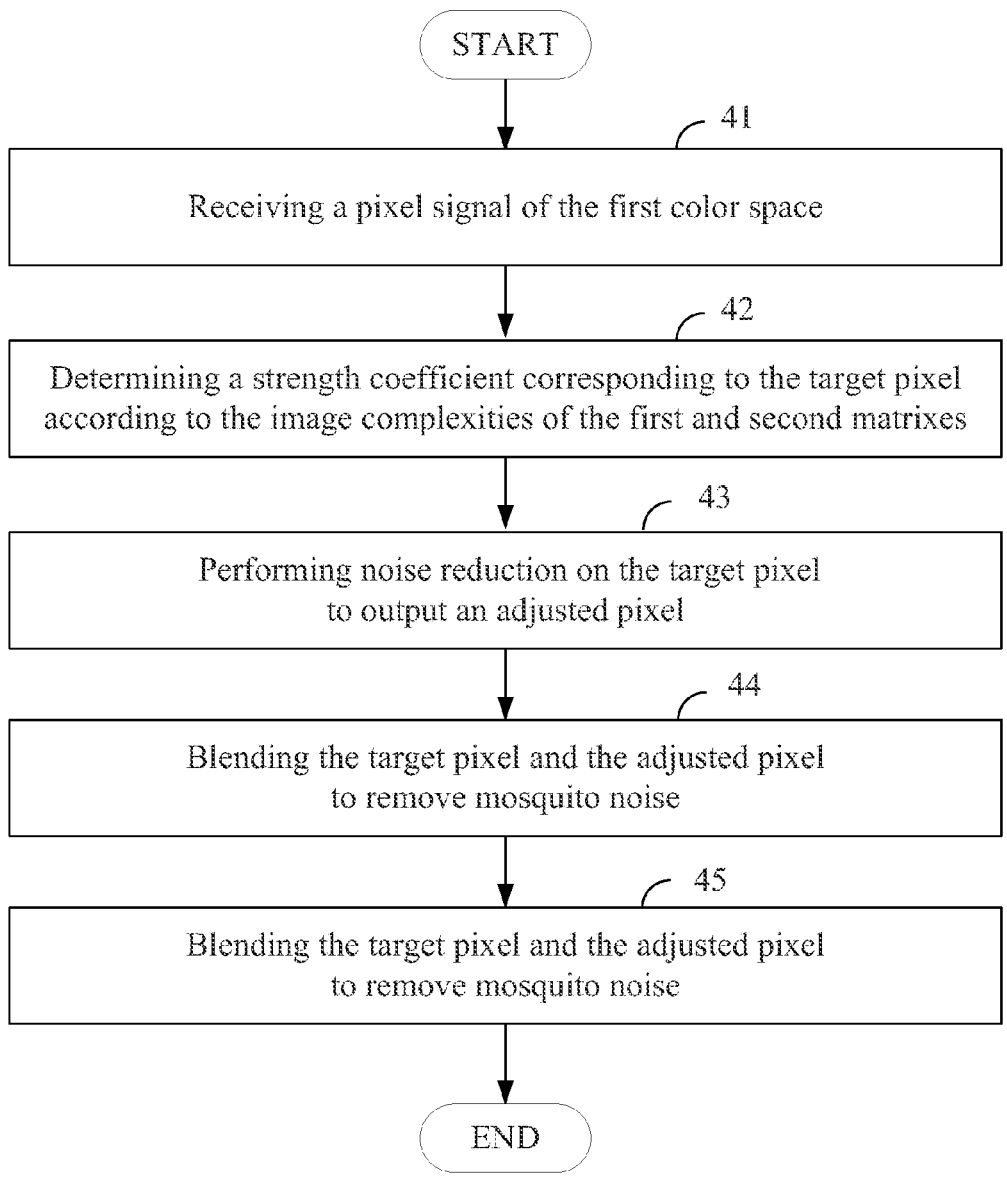
FIG. 4 is a flow chart of a method for color space conversion in accordance with an embodiment of the present disclosure.

FIG. 4 is a flow chart of a method for color space conversion from a first color space to a second color space in accordance with an embodiment of the present disclosure. In Step 41, a pixel signal of the first color space is received. In Step 42, a pixel component on each dimension of the second color space is generated from the pixel signal of the first color space. In Step 43, when the pixel component of any dimension is greater than a first threshold and not greater than an upper limit value of the pixel component, a first compression operation is performed to output a first compressed pixel component, which is not higher than an upper limit value of the dimension in the second color space and has a linear relationship having a first gradient with the pixel component. In Step 44, when the pixel component of any dimension is smaller than a second threshold and not smaller than a lower limit value of the pixel component, a second compression is performed to output a second compressed pixel component, which is not lower than a lower limit value of the dimension in the second color space and has a linear relationship having a second gradient with the pixel component. In Step 45, when the pixel component on any dimension is between the first threshold and the second threshold, the pixel component is outputted directly.

Preferably, the first threshold is greater than the second threshold, the upper limit value of the pixel component on any dimension is greater than the upper limit value of the second color space on the dimension, and the lower limit value of the pixel component on any dimension is smaller than the lower limit value of the second color space on the dimension.

Preferably, the first color space is an xvYCC color space and the second color space is an sRGB color space having three color dimensions, i.e., R, G and B dimensions. The method for color space conversion as illustrated in FIG. 4 is also applied to an HDMI receiver.

Alternatively, Steps 43 to 45 are performed according to a lookup table. The lookup table is stored with the first compressed pixel components, the second compressed pixel components associated with uncompressed original pixel components.

While the disclosure has been described in terms of what is presently considered to be the most practical and preferred embodiments, it is to be understood that the inventive concept needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A circuit for color space conversion and implemented at least in part in hardware, comprising:
    a conversion unit that performs a linear color space compression by converting a pixel signal from a first color space to a second color space, the second color space having a plurality of color dimensions, the conversion unit generating a plurality of pixel components of the color dimensions for the pixel signal, and compressing the pixel components to output a plurality of corresponding compressed pixel components when each of the pixel components is within a corresponding compression interval, the compressed pixel components within a predetermined range of the color dimensions of the second color space,
    wherein the conversion unit comprises a lookup table for storing the pixel components and the corresponding compressed pixel components,
    wherein the conversion unit compresses the pixel components according to the lookup table,
    wherein each pixel component in the corresponding compression interval has a linear relationship with a corresponding compressed pixel component,
    wherein the first color space is an xvYCC color space, and the second color space is an sRGB color space,
    wherein each of the corresponding compression intervals is adjustable according to values stored in the conversion unit, and
    wherein a first pixel value interval of the compression intervals represents a first threshold and an upper limit value of each pixel component, and wherein the corresponding compressed pixel component of a pixel component is not lower than the first threshold and not higher than an upper limit value of the predetermined range.

2. The circuit for color space conversion as claimed in claim 1, wherein the conversion unit outputs the pixel components when the pixel components fall outside the compression intervals.

3. The circuit for color space conversion as claimed in claim 1, wherein the upper limit value of the pixel component is greater than the upper limit value of the predetermined range.

4. The circuit for color space conversion as claimed in claim 1, wherein a second pixel value interval of the compression intervals represents a second threshold and a lower limit value of each pixel component, and wherein the corresponding compressed pixel component of a pixel component is not lower than a lower limit value of the predetermined range.

5. The circuit for color space conversion as claimed in claim 4, further comprising:
    a register unit, coupled to the conversion unit, that stores a first gradient or a second gradient, wherein the linear relationship is proportional to either the first gradient or the second gradient which is different from the first gradient.

6. The circuit for color space conversion as claimed in claim 1, wherein the conversion unit is a part of a high definition multimedia interface (HDMI) receiver.

7. A method for color space conversion, the method comprising:
    receiving, by a conversion unit of a circuit that is implemented at least in part in hardware, a pixel signal of a first color space;
    converting, by the conversion unit of the circuit, the pixel signal from the first color space to a second color space to generate a plurality of pixel components of color dimensions of the second color space; and
    compressing, by the conversion unit of the circuit, the pixel components to output a plurality of compressed pixel components when each of the pixel components is within a corresponding compression interval, the compressed pixel components within a predetermined range of the color dimensions of the second color space,
    wherein the act of compressing the pixel components comprises looking up a lookup table having stored therein the pixel components and the compressed pixel components, wherein each pixel component in the corresponding compression interval has a linear relationship with a corresponding compressed pixel component, wherein the first color space is an xvYCC color space, and the second color space is an sRGB color space, wherein each of the corresponding compression intervals is adjustable according to values stored in the conversion unit, and wherein a first pixel value interval of the compression intervals represents a first threshold and an upper limit value of each pixel component, and wherein the upper limit value of each pixel component is greater than an upper limit value of the predetermined range and not lower than the first threshold.

8. The method for color space conversion as claimed in claim 7, further comprising:

outputting the pixel components when the pixel components fall outside the compression intervals.

9. The method for color space conversion as claimed in claim 7, wherein at least one compressed pixel component is determined according to the corresponding pixel component, the first threshold and a first gradient, and wherein the linear relationship is proportional to the first gradient.

10. The method for color space conversion as claimed in claim 7, wherein a second pixel value interval of the compression intervals represents a second threshold and a lower limit value of each pixel component.

11. The method for color space conversion as claimed in claim 10, wherein the lower limit value of each pixel component is smaller than a lower limit value of the predetermined range.

\* \* \* \* \*